United States Patent [19]

Abiven et al.

[11] Patent Number: 5,046,074
[45] Date of Patent: Sep. 3, 1991

[54] SYNCHRONIZATION METHOD AND SYNCHRONIZATION RECOVERY DEVICES FOR HALF-DUPLEX COMMUNICATION

[75] Inventors: Jacques Abiven, Plouaret; Gilles Ramel, Lannion, both of France

[73] Assignee: L'Etat Francais represente par le Ministre des Postes, Telecommunications et de l'Espace (Centre d'Etudes des Telecommunications, Issy-Les-Moulinfaux, France

[21] Appl. No.: 394,322

[22] Filed: Aug. 16, 1989

[30] Foreign Application Priority Data

Aug. 19, 1988 [FR] France ................................ 88 11038

[51] Int. Cl.$^5$ .............................................. H04L 7/04
[52] U.S. Cl. ..................................... 375/111; 375/114; 370/105.1
[58] Field of Search ............... 375/111, 113, 114, 107; 370/31, 105.1, 101, 105.4; 340/825.2, 825.21, 824.14

[56] References Cited

U.S. PATENT DOCUMENTS

| | | | |
|---|---|---|---|
| 4,611,336 | 9/1986 | Fryer | 375/111 |
| 4,679,188 | 7/1987 | Fukuda et al. | 370/105.1 |
| 4,803,703 | 2/1989 | DeLuca et al. | 375/114 |
| 4,841,521 | 6/1989 | Amada et al. | 370/31 |
| 4,872,186 | 10/1989 | Gerhart et al. | 370/101 |

Primary Examiner—Douglas W. Olms
Assistant Examiner—Ralph E. Smith
Attorney, Agent, or Firm—Lowe, Price, LeBlanc, & Becker

[57] ABSTRACT

The invention enables extremely quick and reliable recovery of the synchronization of a communication signal transmitted in a half-duplex link. Such a communication signal comprises first time intervals including useful data, and second time intervals devoid of useful data and in a given logic state. At the beginning of each of the first time intervals is included a digital synchronization pattern which is then considered as associated with the second time intervals to form synchronization words of great length. The synchronization of the communication signal is recovered by detecting the synchronization words of great length in the communication signal.

19 Claims, 1 Drawing Sheet

SYNCHRONIZATION METHOD AND SYNCHRONIZATION RECOVERY DEVICES FOR HALF-DUPLEX COMMUNICATION

BACKGROUND OF THE INVENTION

1. Field of the Invention

The present invention relates to the synchronization of digital signals in communication links in general. More specifically, the invention relates to the synchronization of digital signals of packets and frames of packets in half-duplex communication links especially by means of optical fibers.

Half-duplex transmission of communication signals is an interesting solution for optical fiber telecommunications networks. In fact, this solution enables a single optical fiber to be used for two transmission directions and for several subscriber communications, thereby ensuring optimum efficiency of the fiber's very high capacity.

In a half-duplex communication, e.g. between a telephone exchange and a subscriber installation, the link between the exchange and the subscriber installation is not permanent. This requires synchronization to be recovered at the beginning of each communication period. In order to achieve good listening comfort for the communication, synchronization recovery, also known as frame alignment recovery in ISDN type telecommunications networks, should be performed extremely quickly, usually in less than 10 milliseconds.

2. Description of the Prior Art

The known frame alignment recovery devices are usually designed for duplex type bidirectional communications. In these devices, frame alignment is declared acquired, when the communication is set up, after a specific frame alignment pattern has been successively received several times; this entails a relatively long frame alignment recovery time. Such devices are therefore not suited to speedy recovery of frame alignment in a half-duplex communication.

OBJECT OF THE INVENTION

The main object of this invention is to provide a synchronization method and synchronization recovery devices intended for half-duplex communication, taking advantage of a particular waveform of the half-duplex communication signals, to introduce into said signals very long synchronization words from which synchronization recovery is obtained very quickly and with good reliability.

SUMMARY OF THE INVENTION

Accordingly, the invention relates to a synchronization method wherein a communication signal is transmitted from a first end of a half-duplex bidirectional link and received at a second end of the link. The signal comprises alternate first and second time intervals.

The first time intervals are occupied by useful data. The second time intervals are devoid of useful data and are in a first given logic state.

In the first (transmitting) link end, a predetermined digital synchronization pattern is included at the beginning of each of the first time intervals. In the second link end, the pattern is considered as being associated with said second time intervals with which it constitutes synchronization words which are detected in said communication signal thereby recovering synchronization of said signal.

A synchronization recovery device embodying the invention therein comprises first means for detecting sequences of bits in the first logic state in the communication signal; each sequence has a duration equal to at least the duration of the second time intervals, second means for detecting the synchronization pattern in the communication signal, and means connected to the first and second detecting means for deriving a synchronization pulse when a synchronization pattern is detected immediately after detection of one of said sequences of bits.

According to another feature, the synchronization recovery device further comprises means connected to the deriving means for signalling a synchronization anomaly after a predetermined number of successive failures to detect the synchronization pulse.

According to the invention, the synchronization word is practically inimitable due to its great length, and the synchronization is reliably recovered after just one detection of the synchronization word.

BRIEF DESCRIPTION OF THE DRAWING

Further features and advantages of the invention will be apparent from the following particular description of the synchronization process and of several preferred embodiments of a synchronization recovery device embodying this invention as illustrated in the corresponding accompanying drawings in which.

DESCRIPTION OF THE PREFERRED EMBODIMENT

In a transmitting-receiving end equipment in a half-duplex link, a synchronization recovery device embodying the invention is situated after a duplexing device having a bidirectional port connected to the transmission support of the link, such as an optical fiber, for half-duplex transmitting and receiving digital signals such as e.g. digital packets or frames, an input receiving an digital signal outgoing through the port to be transmitted in the transmission support, and an output providing a digital signal incoming into the port and coming from the transmission support.

It is considered a half-duplex transmission e.g. with a repetition period $TR=500$ $\mu s$ and a bit transmission frequency $Fb=5.120$ MHz to transmit digital frames of length $L=1024$ bits.

Figure 1:
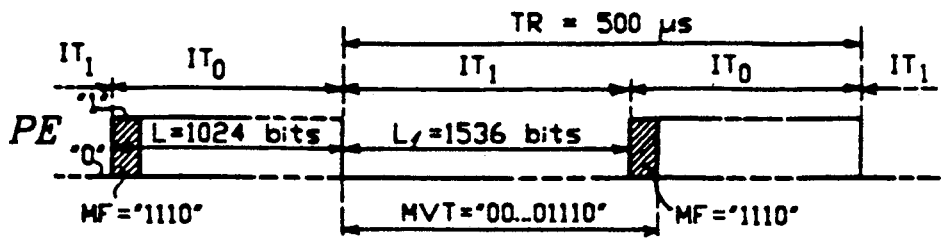
FIG. 1 is an illustration of the format of a half-duplex communication digital signal.

In reference to FIG. 1, the incoming digital signal PE has first and second alternate time intervals $IT_0$ and $IT_1$ respectively having lengths of $L=1024$ bits and $L_1=1536$ bits. The repetition period TR of intervals $IT_0$ and $IT_1$, combined has corresponds also to a length $L+L_1=2560=5.120\times 500$ bits. The time intervals $IT_0$ each contain an incoming frame coming from the transmission support. During the second time intervals $IT_1$, the transmitting-receiving end equipment in which the synchronization recovery device is included, is in an outgoing frame transmission phase. The incoming digital signal PE has then a constant value throughout the duration of intervals $IT_1$, e.g. a zero value corresponding to logic state "0". The time intervals $IT_1$ are hereafter referred to as empty time intervals i.e., devoid of useful data. The empty intervals $IT_1$ have a length $L_1=1536$ bits which is greater than the length $L=1024$ bits of the time intervals $IT_0$ due to an idle time which is scheduled between the end of the transmission of an outgoing frame and the switching of the communication direction to receive an incoming frame.

According to the method of the invention, the empty time intervals $IT_1$ are used for synchronization. An empty interval $IT_1$ is associated with a given pattern MF placed at the beginning of the data bit frame following the interval $IT_1$ to constitute a synchronization word or frame alignment word MVT. The insertion of the pattern MF into the second time intervals $IT_1$ is performed in the receiving part of the other end equipment supplying outgoing frames to the transmission. The pattern MF comprises a first bit in the state "1", i.e., in a state that is complementary to the state "0" corresponding to the empty intervals $IT_1$. The length of the pattern MF is very short by comparison, e.g. equal to $n=4$ bits. The pattern MF is e.g. comprised of the binary combination "1110". Thus to the frame alignment word MVT corresponds the binary combination "00 . . . 01110" comprising a sequence of $L_1=1536$ bits in the state "0" followed by the pattern MF="1110".

Figure 2:
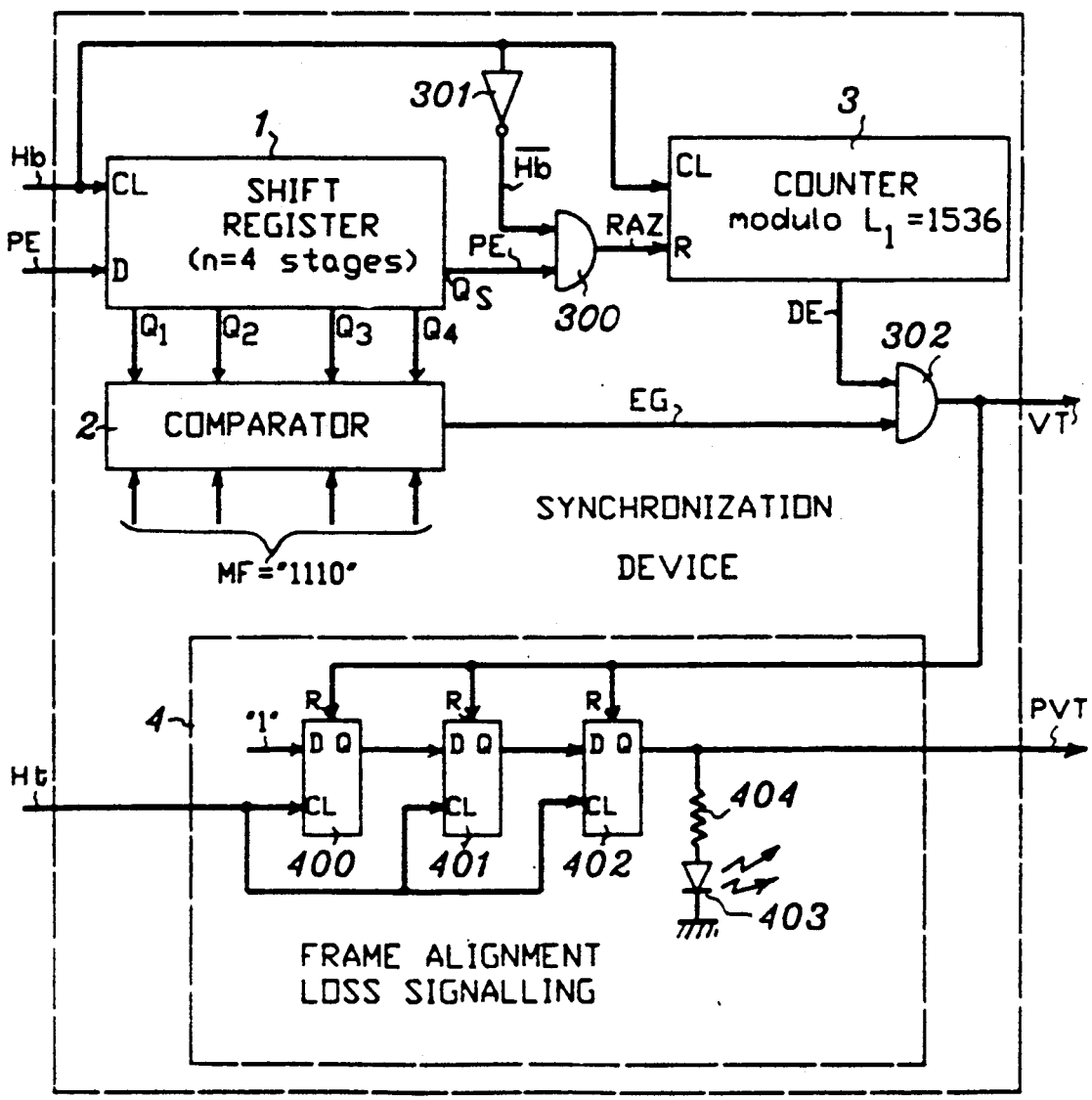
FIG. 2 is a schematic block-diagram of a synchronization recovery device embodying the invention.

In reference to FIG. 2, the synchronization recovery device embodying the invention is mainly comprised of a shift register 1, a word comparator 2, a binary counter 3, and a frame alignment loss signalling circuit 4.

The shift register 1 comprises $n=4$ stages. It receives the incoming packet signal PE at a data input D and a 8 bit transmission rate signal Hb of frequency $Fb=5.120$ MHz at a clock input CL. Four parallel data outputs Q1 to Q4 of the register 1 are respectively connected to four inputs of the comparator 2. A serial data output QS of the register 1 provides the packet signal PE delayed by $n=4$ binary elements.

The purpose of the comparator 2 is to detect the pattern MF="1110" in the signal PE when the pattern is loaded in the shift register 1. Four second inputs of the comparator 2 respectively receive the $n=4$ bits of the pattern MF which are stored e.g. in a wired read-only memory. The comparator 2 issues from output a signal EG in state "1" when the pattern MF is detected in the signal PE.

The binary counter 3 is a modulo-$L_1=1536$ bits counter. The purpose of the counter 3 is to detect the empty time intervals $IT_1$ in the signal PE. To do so, the counter 3 receives the rate signal Hb at a clock input CL and a zero-resetting signal RAZ at a reset input R. An overflow indicating signal DE in the state "1" is supplied by the counter 3 when a sequence of at least $L_1=1536$ consecutive bits is detected in the signal PE.

The resetting signal RAZ is produced by a two-input logic AND gate 300 receiving the signal PE coming from the register 1 and a complementary rate signal $\overline{Hb}$. The signal $\overline{Hb}$ is produced by a logic inverter 301 from the rate signal Hb.

Another two-input logic AND gate 302 is provided in the device so as to produce a frame alignment signal VT from the signals EG and DE.

The loading and shifting of the bits of signal PE in the register 1 are controlled by states "1" of the rate signal Hb occurring during first half-periods of the signal Hb having a duration equal to $1/(2\cdot Fb)$. During second half-periods of the rate signal Hb corresponding to states "0" of said signal Hb, the resetting of the counter 3 at zero is controlled by bits in the state "1" of the signal PE contained in the time intervals $IT_0$.

Subsequent to serial output QS of the register 1 transmitting the last of the $L_1=1536$ bits in the state "0" contained in an empty time interval $IT_1$, the signal RAZ has been in the inactive state "0" for a duration equal to at least $IT_1$. The counter 3 has then counted at least $L_1=1536$ pulses of the rate signal Hb and is in an overflow state. The signal DE is therefore in the state "1". When the first bit in the state "1" of the pattern MF="1110" is supplied by the serial output QS of the register 1 responsive to a rise edge of the signal Hb, all the bits of the pattern MF are loaded in the register 1 and the signal EG derived by comparator 2 switches to state "1". The frame alignment signal VT=DE·EG also switches over to state "1". At the end of a duration equal to $1/(2\cdot Fb)$ after the transfer of the first bit of the pattern MF via the serial output QS of the register 1 and the switching of the signal EG to state "1", the signal $\overline{Hb}$ switches over to state "1" and opens the gate 300. The signal RAZ then switches over to state "1" and resets the counter 3 at zero. The signal DE jumps to the state "0", the gate 302 closes, and the frame alignment signal VT returns to state "0". A detection of the frame alignment word MVT in the incoming digital signal is thereby signalled by a pulse in the state "1" of duration equal to $1/(2\cdot Fb)$ figuring in the signal VT.

The purpose of the frame alignment loss signalling circuit 4 is to signal frame alignment loss after e.g. $m=3$ consecutive failures to detect the frame alignment word MVT. Circuit 4 comprise $m=3$ analogous flips-flops 400 to 402 connected in cascade.

The $m=3$ flips-flops are preferably of type D. A state "1" is applied at a data input D of the first flip-flop 400. The data inputs D of the flips-flops 401 and 402 are respectively connected to data outputs Q of the flips-flops 400 and 401. Zero-resetting inputs R of the flips-flops 400 to 402 receive the "1" state pulses of the frame alignment signal VT. A frame rate signal Ht of period $Tt=TR=500$ us is applied at clock inputs CL of the flips-flops 400 to 402.

Only when at least $m=3$ successive pulses in the state "1" are missing in the frame alignment signal VT, i.e., after $m=3$ failures to detect the frame alignment word MVT, does the state "1" applied at the data input D of the flip-flop 400 go through the $m=3$ flips-flops to be provided from the data output Q of the last flip-flop 402 and to produce a frame alignment loss signal PVT in the state "1".

A light-emitting diode 403 supplied via a resistor 404 by the signal PVT is provided in the circuit 4 so as to produce a visual alarm display in the event of frame alignment loss.

What we claim is:

1. A method to synchronize a communication signal in a half-duplex bidirectional link extending between a first end and a second end,
   said signal being transmitted from said first end in said link and being received into said second end via said link, and comprising alternated first and second time intervals,
   useful data from said first end being received by said second end during said first time intervals,
   a given logic state meaning that no useful data is received in said second end, being applied to said second end during said second time intervals,
   each of said first time intervals beginning by a predetermined digital synchronization pattern derived by said first end, and in said second end, said pattern being series-received with said given logic state in said second time intervals, thereby constituting synchronization words, and said synchronization words being detected in said communication signal thereby recovering synchronization of said signal words which are detected in said communication signal thereby recovering synchronization of said signal.

2. A synchronization recovery device included in one of ends of a half-duplex bidirectional link and receiving a communication signal transmitted from the other link end and through said link, said signal comprising first and second time intervals, said first time intervals beginning with a predetermined digital synchronization pattern followed by useful data, said second time intervals being devoid of useful data and in a first logic state, said synchronization pattern including at least a bit in a second logic state which is complementary to said first logic state, said device comprising first means for detecting in said communication signal, sequences of bits in the first logic state with duration equal to at least the duration of said second time intervals, second means for detecting said synchronization pattern in said communication signal, and means connected to said first and second detecting means for deriving a synchronization pulse when said synchronization pattern is detected immediately after one of said bit sequences.

3. The device of claim 2 wherein said first detecting means comprises a binary counter which is incremented by bit rate signal pulses corresponding to said communication signal and means for resetting said counter by bits contained in said first time intervals and in said second logic state.

4. The device of claim 2 comprising means connected to said deriving means for detecting an absence of said synchronization pulse during a predetermined number of successive periods each including one first time interval and one second time interval thereby signalling a synchronization anomaly.

5. A method of communicating a message from a first terminal to a second terminal via a half-duplex bidirectional link comprising: at the first terminal forming sequential communication frames each including first and second abutting sequential time intervals respectively having $N_1$ and $N_2$ serial bits, each of said bits having the same predetermined time duration so that the first and second intervals respectively have first and second time durations, the last bit of each first interval preceding immediately before the first bit of the next following second interval, all of the $N_1$ bits of each first interval having the same predetermined value that is independent of the message content, the first N bits of each second interval having a predetermined binary sequence including at least one bit having a value different from the value of the bits of the first interval, where each of N, $N_1$ and $N_2$ is an integer greater than one, the remaining bits of each second interval being determined by the message; transmitting the bits in the first and second time intervals from the first terminal to the second terminal via the half-duplex bidirectional link; at the second terminal responding to the bits in the first and second time intervals as received at the second terminal from the first terminal via the link to indicate that frame alignment is present for the message, the frame alignment being detected by detecting the presence of the sequential $N_1$ bits of the first interval having said predetermined value followed immediately by the first N bits of the second interval having the predetermined sequence.

6. The method of claim 5 wherein N is much less than $N_1$ or $N_2$.

7. The method of claim 5 wherein each of said frames has a predetermined duration, and signalling that the frame alignment has been lost in response to frame alignment not being detected for a predetermined period of time associated with $N_3$ frames, where $N_3$ is an integer greater than one.

8. The method of claim 5 wherein the presence of the sequential $N_1$ bits of the first interval having said predetermined value is detected by: (a) supplying at least $N_1$ clock pulses having the same frequency as the bits to a modulo $N_1$ counter at the second terminal, (b) supplying a replica of the bits as received at the second terminal to a reset input of the counter so that the counter is in an overflow state when all of the bits of the first interval have been received at the second terminal, and (c) detecting the overflow condition of the counter.

9. The method of claim 8 wherein the presence of the first N bits of the second interval having the predetermined sequence is detected by supplying a replica of the bits as received at the second terminal to a shift register having N stages, and deriving an enable signal when the contents of the shift register are the same as the values of the bits in the predetermined sequence; and sensing the simultaneous presence of the enable signal and the overflow condition to signal that frame alignment is present.

10. The method of claim 9 further including supplying the bits at the last stage of the shift register to the reset input of the counter.

11. The method of claim 8 wherein the presence of the first N bits of the second interval having the predetermined sequence is detected by supplying a replica of the bits as received at the second terminal to a shift register having N stages, and deriving an enable signal when the contents of the shift register are the same as the values of the bits in the predetermined sequence.

12. Apparatus for synchronizing a message transmitted from a first terminal to a second terminal via a half-duplex bi-directional link wherein the message is synchronized at the second terminal in response to bits received at the second terminal from the first terminal via the half-duplex bi-directional link, the first terminal forming sequential communication frames each including first and second abutting sequential time intervals respectively having $N_1$ and $N_2$ serial bits, each of said bits having the same predetermined time duration so that the first and second intervals respectively have first and second time durations, the last bit of each first interval preceding immediately before the first bit of the next following second interval, all of the $N_1$ bits of each first interval having the same predetermined value that is independent of the message content, the first N bits of each second interval having a predetermined binary sequence including at least one bit having a value different from the value of the bits of the first interval, where each of N, $N_1$ and $N_2$ is an integer greater than one, the remaining bits of each second interval being determined by the message, the second terminal comprising means responsive to the bits in the first and second time intervals as received at the second terminal for indicating that frame alignment for the frame is present, said last named means including means for detecting the presence of the sequential $N_1$ bits of the first interval having said predetermined value followed immediately by the first N bits of the second interval having the predetermined sequence.

13. The apparatus of claim 12 wherein N is much less than $N_1$ or $N_2$.

14. The apparatus of claim 12 wherein each of said frames has a predetermined duration, and means at the second terminal for signalling that frame alignment has been lost in response to frame alignment not being detected for a predetermined period of time associated with $N_3$ frames, where $N_3$ is an integer greater than one.

15. The apparatus of claim 14 wherein the means for signalling that frame alignment has been lost comprises $N_3$ cascaded register stages responsive to clock pulses having a period equal to the duration of one of said frames and to a signal indicating the presence of frame alignment derived from the means for indicating frame alignment.

16. The apparatus of claim 12 wherein the means for detecting the presence of sequential $N_1$ sequential bits of the first interval having said predetermined value includes a modulo $N_1$ counter having a clock input responsive to clock pulses having the same frequency as the bits and a reset input responsive to the bits in the first and second time intervals and an overflow output on which is derived a first enable signal in response to $N_1$ consecutive binary bits having the predetermined value being supplied to the reset input.

17. The apparatus of claim 16 wherein the means for detecting the presence of the sequential $N_1$ bits of the first interval having said predetermined value followed immediately by the first N bits of the second interval having the predetermined sequence includes a shift register having N stages responsive to the bits of the first and second intervals, the reset input of the modulo $N_1$ counter being responsive to bits derived from stage N of the shift register, means for deriving a second enable signal in response to the contents of the shift register correlating with the N bits having values representing the predetermined binary sequence, and means responsive to the simultaneous derivation of the first and second enable signals for indicating that frame alignment is present.

18. The apparatus of claim 17 further including means for signalling that frame alignment has been lost, said last named means comprising $N_3$ cascaded register stages responsive to clock pulses having a period equal to the duration of one of said frames and to a signal indicating the presence of frame alignment derived from the means for indicating frame alignment.

19. The apparatus of claim 18 wherein each of the cascaded register stages includes a D flip-flop having a Q output, D input, a reset input responsive to the signal indicating the presence of frame alignment, a clock input responsive to the clock pulses having a period equal to the duration of one of said frames, the D input of the D flip-flop of stage P being responsive to the Q output of stage $(P-1)$, where $P=2 \ldots N_3$, the D input of the flip-flop of stage 1 being responsive to a predetermined level.

* * * * *